July 3, 1956  J. C. OWENS  2,752,938
TANK REFILLING VALVE
Filed Nov. 22, 1954

JESSE C. OWENS
INVENTOR.

BY
Stuart M Maule
ATTORNEY

United States Patent Office 2,752,938
Patented July 3, 1956

2,752,938

TANK REFILLING VALVE

Jesse C. Owens, Los Angeles, Calif.

Application November 22, 1954, Serial No. 470,355

7 Claims. (Cl. 137—438)

This invention relates to valves, and more particularly to float actuated valves of the type commonly employed for refilling toilet flushing tanks.

An object of the present invention is to provide a tank refilling valve of new and improved design.

Another object is to provide a float actuated valve consisting of a novel and unusually efficient mechanism movable in response to movement of a float, for closing the valve's inlet port and thereby interrupting flow of water through the valve.

Another object is to provide a toilet flush tank supply valve having novel means for breaking any siphonic action that might otherwise develop in the valve in the event of interruption in the pressure in the pipe normally supplying water to the valve.

A more detailed object in this connection is the provision of a toilet tank supply valve having anti-siphonic air vents establishing communication between the atmosphere and the interior of the valve to prevent the possibility of drawing contaminated water into the supply system if and when conditions develop which are conducive to reversal of flow within the valve.

Another object is to provide a check valve construction operable to provide a positive, mechanical seal co-operative with the air vents in preventing flow reversal within the valve.

Another object is to provide a valve construction of the character described which is designed for unusually quiet operation in regard to movement of mechanical parts of the valve, to flow of water through the valve when the valve is open, and to delivery of water to the tank served by the valve.

The invention possesses other objects and features of advantage, some of which, with the foregoing, will be set forth in the following description of the preferred forms of my invention which are illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings.

Figure 1:
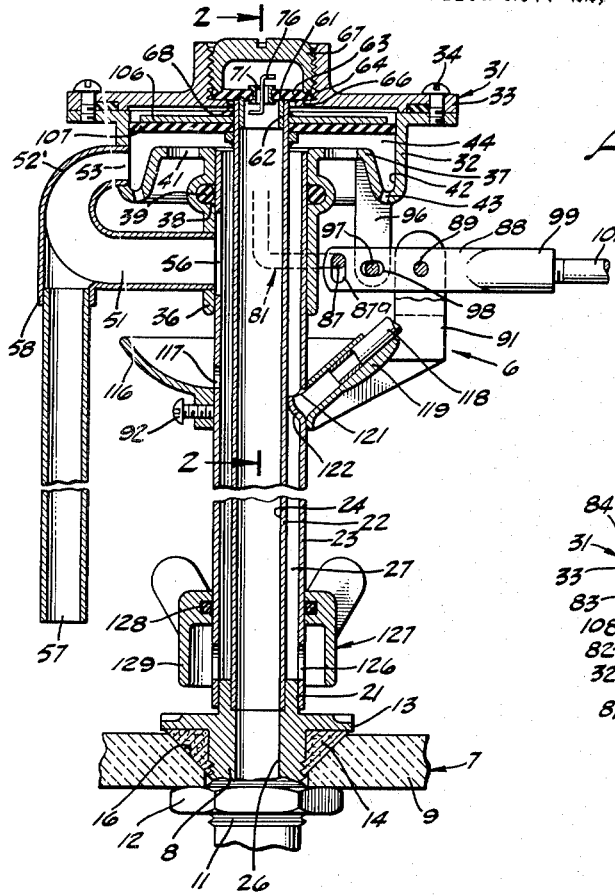
Figure 1 is a vertical, medial sectional view of a toilet tank refilling valve incorporating the principles of the present invention.
Figure 2:
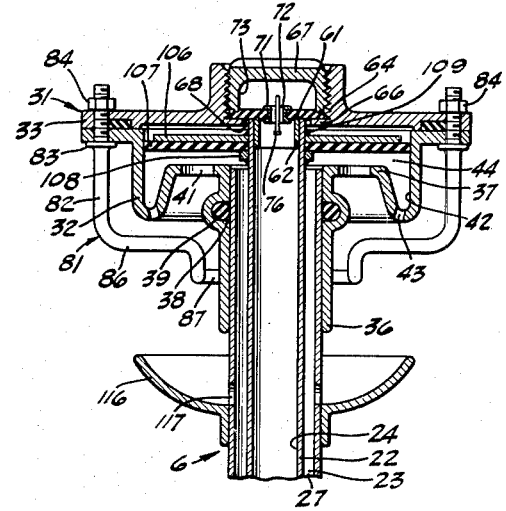
Figure 2 is a section taken on the line 2—2 of Fig. 1.

Referring first to the modification of my invention which is illustrated in Figs. 1 and 2, it will be observed that my improved tank filling valve, indicated in its entirety at 6, is mounted within the tank 7, to which it is adapted to control flow of water, by means of a tubular sleeve 8 extending through the bottom 9 of the tank 7. The shank of the sleeve 8 is threaded as indicated at 11 to receive a nut 12 which, when tightened, draws the sleeve 8 downward so as to press a flange 13 integral with the sleeve 8 and disposed within the tank 7, against the top of a conical washer 14 of suitable resilient material. This washer is seated within a complementary recess 16 in the upper surface of the bottom 9 of the tank and, consequently, when the nut 12 is tightened into the socket 16, it not only rigidly secures the sleeve 8 to the tank bottom 9, but it also establishes a fluid-tight seal therebetween.

The lower end of the sleeve 8 extends downward beyond the threaded portion 11 and is provided with means (not shown) for connecting it to a suitable source of water under pressure.

Upstanding from the under surface of the flange 13 of the sleeve 8, is an annular flange 21 and concentric tubes 22 and 23 are rigidly, and preferably permanently, attached to the inner and outer annular surfaces of the flange 21 as by welding, soldering or the like. The tubes 22 and 23 are so proportioned that the bore 24 of the tube 22 constitutes a continuation of the bore 26 of the sleeve 8 with the result that the tube 22 functions as a water pressure supply tube for the valve 6. A space 27 of annular cross-section is left between the inner and outer tubes 22 and 23; and this space 27 constitutes the passageway through which water leaves the valve 6 and flows therefrom to the interior of the tank 7.

A head 31, preferably circular in plan, is slidably mounted upon the outer tube 23 adjacent the upper end thereof. This head 31 constitutes the main housing of the valve 6 and comprises a lower casting or bowl 32 and an upper casting or cover plate 33 removably secured to the bowl 32 by a plurality of screws 34 spaced at suitable intervals about the periphery of the head 31. The mounting for the head 31 whereby the head is slidably arranged upon the tube 23 comprises a tubular sleeve 36 integral with and extending downward from the bottom wall 37 of the bowl 32. The sleeve 36 is bored complementarily to the exterior surface of the tube 23 to establish a suitable sliding fit therewith. An annular recess 38 is provided in the bore of the sleeve 36 for the reception of an O-ring or other suitable type of gasket 39 which assists in making an efficient sliding engagement between the head 31 and the tube 23.

A plurality of air inlet, or "anti-siphonic" orifices 41 are provided in the bottom wall 37 of the bowl 32, these orifices 41 preferably being arranged in a circular pattern concentric with the sleeve 36. An annular depression or trough 42 is likewise formed in the bottom wall 37 of the bowl 32 concentric with and of greater diameter than the circle described by the air inlet orifices 41. A plurality of bleeder holes 43 extend through the bottom of the trough 42, these holes 43 preferably being inclined downward and inward slightly, as clearly shown in Figs. 1 and 2. Both the air inlet orifices 41 and bleeder holes 43 establish communication between the ambient atmosphere and the valve chamber 44 defined within the head 31 between the bowl 32 and the cover plate 33.

An outlet passage 51 from the valve chamber 44 is provided by a tube 52 having an 180° bend therein to permit attachment of the upper end of the tube 52 to the side of the bowl 32 where it communicates with the valve chamber 44 through an auxiliary outlet port 53 in the side wall of the bowl 32, while the lower end of the tube 52 is connected to the outer or discharge tube 23 where it communicates with the discharge passage 27 through suitably aligned ports 54 and 56 respectively, in the sleeve 36 and the wall of the outer tube 23. Consequently, water passing through the valve head 31 may flow from the valve chamber 44 through the tube 52 and into the discharge passage 27 between the tubes 22 and 23 through which the water may readily flow to the interior of the tank 7. If desired, a secondary outlet from the tube 52 may be provided in the form of an auxiliary tube 57 extending straight downward from the reversely bent portion of the tube 52 to which it is attached by means of a suitable downwardly extending nipple 58 integral with the tube 52 and having a bore establishing communication between the passage 51 within the tube 52 and the bore of the tube 57.

The water supply tube 22 extends through the discharge tube 23 and to a considerable elevation above the upper end of the latter. A valve seat 61 is provided at the upper end of the supply tube 22, this seat being of annular form and circling the bore of the tube 22. The seat 61 is preferably provided by means of a bushing 62 fitted to the bore of the tube 22 and permanently attached to the same as by soldering.

The cover plate 33 carries a valve 63 in the form of a disc of suitable resilient material. The valve 63 is mounted on the cover plate 33 in co-operative relation with the valve seat 61 by being seated within a recess 64 in the top or outer surface of the cover plate 33 and clamped tightly against an annular flange 66 which defines the bottom of the recess 64, by means of a plug 67 threaded into the recess 64 above the valve 63. An axial hole 68 through the flange 66 permits the valve 63 to establish sealing engagement with the valve seat 61.

The valve 63 carries an axially disposed tubular bushing 71 having a relatively restricted bore 72 through which restricted communication is established between the bore of the water supply tube 22 and an enclosed cavity 73 within the plug 67 above the valve 63. A piece of relatively fine wire 76 extends through the bore 72 within which the wire 76 is retained by having both ends bent over at substantially 90° as shown in Fig. 1. The wire 76 fits quite loosely within the bore 72 so as to permit restricted flow of water through the bore 72 and to permit sufficient movement of the wire 76 to clear the bore 72 and thereby prevent accumulation of sediment which might otherwise clog the bore 72.

Opening of the valve 6 to permit flow of water from the supply tube 22 to the valve chamber 44 and thence to the interior of the storage tank 7, is effected by lifting the entire head 31 so as to raise the valve 63 off the seat 61. This is accomplished by means of a substantially U-shaped bracket 81, the vertical legs 82 of which are attached to the head 31 adjacent the peripheral edge of the latter, flanges 83 being provided upon the legs 82 which are drawn upward against an under surface of the head 31 by nuts 84 threaded onto the legs 82. The lower, or horizontal portion 86 of the bracket 81 is provided with a bowed portion 87 which encircles the sleeve 36 in spaced relation therewith, and which passes loosely through a vertically elongated opening 87ª (Fig. 1) in a lever 88 which is pivoted as by a pin 89 to the upper end of a bracket 91 mounted upon the exterior surface of the discharge tube 23 and tightly secured thereto as by a clamping screw 92. Supplementary means interconnecting the head 31 and the lever 88 are provided in the form of a finger 96 rigid with and extending downward from the bowl 32 and connected to the lever 88 by means of a pin 97, a suitably horizontally elongated opening 98 being provided in the lever 88 or in the finger 96, or both, to accommodate the pivot pin 97. At the opposite side of the lever mounting pin 89 from the bracket 81 and finger 96, the lever 88 is extended to provide a socket 99 interiorly threaded to receive the threaded end of a rod 101 by means of which a conventional float (not shown) is connected to the lever 99 in such a way that when the water level within the tank 7 rises, the lever 88 is turned about its pivot pin 89 in a counterclockwise direction as viewed in Fig. 1.

Within its chamber 44, the valve head 31 is provided with upper and lower disc-shaped partitions 106 and 107 respectively. The upper disc 106 is composed of suitable non-corrosive and non-rusting material such as brass and is of sufficient thickness to possess a substantial degree of inherent rigidity. It serves as a backing plate for the lower disc or partition 107 which is composed of suitable resilient material such as rubber or "neoprene." Both discs 106 and 107 are mounted on the upper end of the inlet tube 24, an annular collar 108 being soldered or otherwise permanently attached to the tube 24 in position to bear against the under surface of the partition 107, and thereby hold the central portion of the disc at suitable elevation above the bottom wall 37 of the bowl 32. The upper disc 106 may be permanently attached to the tube 23 as by soldering 109. The partition 107 corresponds in diameter to the inside diameter of the vertical cylindrical wall of the bowl 32 with the result that when the partition 107 is in its uppermost position, as illustrated in Figs. 1 and 2, it makes contact with the interior surface of the bowl 32 throughout its entire periphery and thereby effectually prevents reversal of flow within the head 31. Consequently, the partition 107 co-operates with the "anti-siphonic" orifices 41 to prevent contaminated water from being drawn upward through the discharge tube 23 or the auxiliary tube 57 and through the head 31 into the water supply tube 24, in the event of the development of subatmospheric pressure within the water supply tube 24. However, when the valve 63 is lifted off the seat 61 and any time when normal pressure exists within the water supply tube 24, water will flow around the valve seat 61 onto the upper surface of the disc 106 and past the peripheral edge of the same, imposing hydrostatic pressure upon the upper surface of the partition 107 so as to flex the same downward into engagement with the upper surface of the bottom wall 37 of the bowl 32. When in this lower position, the partition 107 effectually seals the air inlet orifices 41 and thereby assures that water entering the head 31 past the valve 63 will flow into the tank 7 through the U-shaped tube 51 and thence through either or both tubes 57 and 23 to effectuate refilling of the tank 7.

As will readily be understood by the arrangement of the lever 88, bracket 81 and finger 96, illustrated in Figs. 1 and 2, when the water level within the tank 7 lowers, causing the float at the outer end of the rod 101 to drop and causing the lever 88 to turn in a clockwise direction as viewed in Fig. 1, the entire head 31 will be raised through the action of the finger 96. This will lift the valve 63 from the seat 61 and thereby initiate flow of water through the head 31 as hereinabove described. On the other hand, when the water level within the tank 7 reaches that for which the float at the end of the rod 101 is set, the lever 88 will be swung to the position illustrated in Fig. 1, causing the finger 96 to pull the head 31 downward to press the valve 63 onto the seat 61 and thereby prevent further flow of water through the head 31 to the interior of the tank 7.

When the valve 63 first contacts the seat 61 through the mechanical action of the lever 88, water will cease to flow around the upper edge of the seat 61. However, since restricted communication is established between the interior of the water supply tube 24 and the space 73 within the plug 67 above the valve 63, through the bore 72 of the sleeve 71, hydrostatic pressure will almost immediately build up above the valve 63; and since the area of the upper surface of the valve 63 exposed to this pressure is greater than the area of the under surface of the valve 63 exposed to the same pressure, the valve 63 will be pressed tightly against the valve seat 61 by hydraulic pressure in addition to the mechanical action of the lever 88. In this manner, double insurance is provided that the valve 63 will establish leak-proof, sealing engagement with the seat 61.

The vertical elongated opening 87 in the lever 88 through which the medial portion of the bracket 87 extends, is so proportioned that the portion of lever 88 defining the upper end of the opening 87 engages the bracket 81 as the lever 88 approaches its position of maximum rotation in a counterclockwise direction as viewed in Fig. 1. That is to say, the lever 88 engages the bracket 81 just before the head 31 arrives at its lowermost position, and consequently the force of the lever 88 is applied to the head 31 through the bracket 81 just before the valve 63 arrives at its position of full engagement with the seat 61. Therefore, at all times when the valve 63 is closed, the force of the lever 88 is applied to the head 31 at diametrically opposite points thereof instead of through the finger 96 and thus insures against the tendency for the head 31 to assume a canted position which might develop through application of the mechanical pull of the lever 88 through the off-centered finger 96 only.

A catch-basin 116 is mounted upon the discharge tube 23 in position to receive any jets or drops of water escaping from the head 31 through the bleeder holes 43. An opening 117 provided in a side wall of the tube 23 in alignment with the bottom of the catch-basin 116 can thus direct any water caught by the basin 116 into the discharge space 27 between the tubes 23 and 24. In this manner, any water escaping from the head 31 through the bleeder holes 33 is delivered to the interior of the tank 7 in a way to prevent the noise of dripping water which might develop in the absence of the catch-basin 116.

The basin 116 also serves as a support for a conventional refill tube 118, a socket 119 being provided for the reception of an end of the tube 118 and establishing communication between the tube 118 and an orifice 121 in the side wall of the discharge tube 23. A portion 122 of the side wall of the tube 23 is deflected into the space 27 so as to intercept a substantial quantity of water flowing downward within the space 27 and thereby directing the same through the refill tube 118 and thence to the interior of the toilet fixture with which the tank 7 is associated.

Water escapes from the discharge tube 23 to the interior of the tank 7 through a plurality of outlet orifices 126 through the wall of the tube 23 adjacent the lower end of the latter. A silencer 127 in the form of an inverted cup-shaped shield is slidably mounted upon the discharge tube 23, a suitable annular packing 128 being carried by the silencer 127 in position to enhance the security of the sliding engagement between the silencer 127 and the tube 23. The silencer 127 is disposed upon the tube 23 in position for its downwardly extending skirt portion 129 to enclose that portion of the tube 23 within which the discharge orifices 126 are situated, but at outwardly spaced position with respect thereto so as to permit water escaping from the discharge tube 23 through the orifices 126 to pass to the interior of the tank 7 with a minimum of restriction but without the gurgling and splashing noises which might develop in the passing of the silencer 127.

Figure 3:
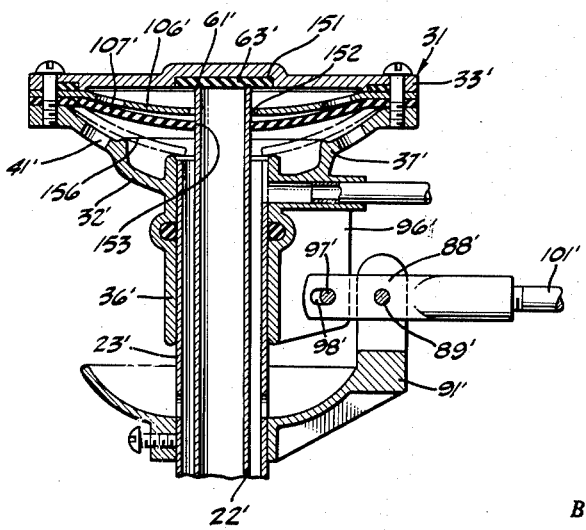
Figure 3 is a view similar to Fig. 1, showing a modified form of value incorporating the principles of the present invention, portions of the figure being broken away to reduce its size.

Figure 3 illustrates a slightly modified form of tank refilling valve incorporating the principles of the present invention. In this modification, the cover plate 33' of the head 31' mounts the valve 63' within a complementary recess 151 in the under surface of the cover plate 33' without the provision of any cavity corresponding to the cavity 73 of the first described modification, above the valve 63'. Consequently, in this modification of the valve, reliance is placed solely upon the mechanical action of the float-actuated lever 88' to press the valve 63' against the valve seat 61' at the upper end of the supply tube 22'.

Another point of differentiation between the modification of Fig. 3 and that of Figs. 1 and 2, is that the upper and lower partition discs 106' and 107', respectively, are secured ot the head 31' at their outer peripheral edges rather than at their central portion as in the first described modification. Consequently, the discs 106' and 107' are gripped between the bowl portion 32' and the cover plate 33' of the head 31', as clearly shown in Fig. 3. Central orifices 152 and 153 are provided in the upper and lower discs 106' and 107', respectively, to permit water to flow to the lower portion of the chamber 44' within the head 31' when the valve 63' is lifted off its seat 61'. Such downward flow of water will force the lower, resilient disc 107' downward, stretching the same so as to enlarge its central aperture 153 and thus permitting water to flow freely from above the disc 107' directly into the discharge tube 23', as clearly indicated by the dotted line position of the lower disc 107'. When in this lower position, the resilient disc 107' contacts an annular shoulder 156 on the bottom wall 37' of the bowl 32' and thus prevents water from escaping to the interior of the tank through the anti-siphonic orifices 41' which are arranged in a circular pattern the diameter of which is slightly greater than that of the annular shoulder 156.

In the absence of water flowing downward from the valve seat 61' through the valve head 31', the inherent resiliency of the disc 107' will carry it upward to the full line position thereof illustrated in Fig. 3. This leaves the air inlet orifices 41' open, establishing communication between the ambient atmosphere and the interior of the head 31' to prevent the development of conditions which might otherwise be conducive to reversal of flow through the valve, and thereby preventing contaminated water from being drawn upward through the discharge tube 23' and through the head 31' to the water supply tube 22'. Double security against such reversal of flow through the valve head 31' is established by the resilient partition or disc 107' inasmuch as when the disc 107' is in its upepr or relaxed position, it makes sealing engagement with the outer surface of the inlet tube 22' just below the valve seat 61' and thereby operates as a check valve further preventing upward flow of water within the valve head 31' exteriorly of the inlet tube 22'.

In this modification of the invention, the valve head 31' is mounted for vertical reciprocatory motion on the outer surface of the inlet tube 23' in the same manner as in the case of the first described modification, i. e., through the expedient of a sleeve 36' integral with and extending downward from the bottom wall 37' of the bowl 32', and slidably disposed upon the tube 23'. Reciprocation of the head 31' upon the tube 23' in response to lifting and lowering of the float, is established by means of a lever 88' suitably mounted by a pin 89' upon a suitable supporting bracket 91', and operably connected to the float (not shown) by a float rod 101' threadedly engaged with the outer end of the lever 88'. The inner end of the lever 88' is connected by a pin 97' extending through a horizontally elongated opening 98' in the lever 88' and engages a web 96' corresponding to the finger 96 of the first described modification in that it is off-centered with respect to the bowl 32' of the head 31'.

Thus it may be seen that when the water level within the tank served by the valve drops, the lever 88' is turned clockwise as viewed in Fig. 3, lifting the entire head 31' and thus removing the valve 63' from the seat 61' and permitting water to flow from the supply tube 22' through the valve head 31' and thence through the discharge tube 23'. Conversely, when the water level within the tank rises to the desired height, the float rotates the lever 88' in the opposite direction, lowering the valve head 31' and seating the valve 63' upon the seat 61' and thereby causing flow of water from the supply tube 22'.

I claim:

1. A storage tank supply valve comprising an inlet tube, means for mounting said supply tube within a storage tank, means for connecting one end of the inlet tube with a source of water under pressure, a valve seat encircling the other end of the inlet tube, a discharge tube mounted about and spaced from said inlet tube to present a discharge passage between the tubes, a head slidably mounted on said discharge tube and having a chamber with which both of said tubes communicate, a valve element carried by said head in opposed relation to said valve seat, means for sliding said head to dispose said valve element optionally in engagement with said seat to close the inlet tube or in position spaced from the seat, said head having an auxiliary discharge port therein communicating with said chamber, said discharge tube having an inlet opening therein communicating with the bore thereof, and a tube secured to said head and interconnecting said discharge port and discharge tube opening.

2. A storage tank supply valve comprising an inlet tube having a valve seat encircling its upper end, a head having a chamber therein and supported from said inlet tube for axial reciprocation with respect thereto, the upper end of said inlet tube extending into said chamber, a valve element mounted on said head in opposed relation to said valve seat to control flow through said inlet tube, said head having an outlet port communicating with a lower portion of the chamber, a discharge tube extending downward from said outlet port, means for moving said head axially of the inlet tube to move the valve element optionally onto or off said seat, a resiliently flexible partition of impervious material encircling the upper end of said inlet tube within said chamber, said partition being adapted to be flexed downward in response to water pressure on its upper surface to displace an edge of the partition into guiding relation with said outlet port, said head having an auxiliary discharge port in the side thereof leading from said chamber, said discharge tube having an inlet opening in the side thereof, and an U-shaped tube secured at one end to the head surrounding said auxiliary discharge port and at the other end to said discharge tube surrounding said opening therein.

3. A storage tank supply valve comprising an inlet tube having a valve seat encircling its upper end, a head having a chamber therein and supported from said inlet tube for axial reciprocation with respect thereto, the upper end of said inlet tube extending into said chamber, a valve element mounted on said head in opposed relation to said valve seat to control flow through said inlet tube, said head having an outlet port communicating with a lower portion of the chamber, a discharge tube extending downward from said outlet port, means for moving said head axially of the inlet tube to move the valve element optionally onto or off said seat, a flexible partition of impervious material sealed to said head at its outer periphery and extending radially inwards therefrom to a central opening through which said inlet tube extends, said partition being adapted to be flexed downward in response to water pressure against its upper surface and simultaneously stretched to enlarge said opening and thereby permit flow from above the partition to said outlet, said head having an auxiliary discharge port in the side thereof leading from said chamber, said discharge tube having an inlet opening in the side thereof, an U-shaped tube leading from said auxiliary discharge opening to said inlet opening, and an auxiliary discharge tube secured to the intermediate portion of said U-shaped tube in communication with the bore thereof and extending downward therefrom exteriorly of said discharge tube.

4. A storage tank supply valve comprising an inlet tube having a valve seat encircling its upper end, a head having a chamber therein and supported from said inlet tube for axial reciprocation with respect thereto, the upper end of said inlet tube extending into said chamber, a valve element mounted on said head in opposed relation to said valve seat to control flow through said inlet tube, said head having an outlet port communicating with a lower portion of the chamber, means for moving said head axially of the inlet tube to move the valve element optionally onto or off said seat, and a resiliently flexible partition within said chamber and through which said inlet tube extends, said partition being sealed to said tube and extending radially outward to a position adjacent the inner surface of the chamber and being adapted to be flexed downward in response to water pressure against its upper surface to displace its outer peripheral edge and thereby guide downward flow within the chamber, and a backing plate reinforcing said partition to limit upward motion thereat with respect to the tube.

5. A storage tank supply valve comprising a housing having a chamber therein, a supply tube communicating with said chamber and having a valve seat at the end of the tube within the chamber, a valve mounted on the housing within the chamber and movable into and out of engagement with the seat to control flow from the tube into the chamber, means for moving the valve, said housing having an annular trough opening upward into said chamber and a plurality of drain openings leading from the trough through the bottom of the housing, and a catch basin supported from said inlet tube below said drain openings and having a drain opening in the bottom of the basin adjacent the outer surface of the inlet tube.

6. A storage tank supply valve comprising a housing defining a valve chamber therewithin and having an outlet port leading from the bottom of the chamber, a supply tube extending through a wall of the housing and having a valve seat at its end within the chamber, a discharge tube extending downward from said outlet port, a valve mounted within said chamber and movable into and out of engagement with said seat to control flow from the supply tube into the chamber, means for moving the valve, said housing having a trough opening upward into said chamber and a drain opening leading from the trough through the bottom of the housing, and a catch basin mounted on said discharge tube below said drain opening, said discharge tube having a port therein leading from the bottom of the basin to the interior of the discharge tube.

7. A storage tank supply valve comprising a housing defining a valve chamber therewithin and having an outlet port leading from the bottom of the chamber, a supply tube extending through a wall of the housing and having a valve seat at its end within the chamber, a discharge tube extending downward from said outlet port, a valve mounted within said chamber and movable into and out of engagement with said seat to control flow from the supply tube into the chamber, means for moving the valve, a partition of flexible material within the chamber, said partition being secured at its peripheral edge to the housing and having a central opening therein establishing communication between the portions of the chamber above and below the partition, said housing having a vacuum breaking orifice in its bottom wall spaced outward from the central opening of said partition, and said partition being adapted to be flexed downward into sealing engagement with said orifice by water pressure above the diaphragm, and a catch basin mounted on said discharge tube below said orifice, said discharge tube having a port therein leading from the bottom of the basin to the interior of said discharge tube.

References Cited in the file of this patent

UNITED STATES PATENTS

| | | |
|---|---|---|
| 1,503,433 | Shaffer et al. | July 29, 1924 |
| 2,609,830 | Smith | Sept. 9, 1952 |
| 2,667,179 | Bennett | Jan. 26, 1954 |
| 2,681,662 | Smith | June 22, 1954 |